United States Patent [19]

Vinciguerra

[11] Patent Number: 4,457,634
[45] Date of Patent: Jul. 3, 1984

[54] PIVOTED SEGMENTAL BEARING

[75] Inventor: Costantino Vinciguerra, Florence, Italy

[73] Assignee: Nuovo Pignone S.p.A., Florence, Italy

[21] Appl. No.: 390,685

[22] Filed: Jun. 21, 1982

[30] Foreign Application Priority Data

Jul. 7, 1981 [IT] Italy ............................. 22776 A/81

[51] Int. Cl.³ .................... F16C 17/00; F16C 27/02; F16C 17/26
[52] U.S. Cl. ................................. 384/302; 384/215; 384/309; 384/312
[58] Field of Search ............ 384/302, 309, 311, 312, 384/398, 215, 218, 221, 224, 147

[56] References Cited

U.S. PATENT DOCUMENTS

| | | | |
|---|---|---|---|
| 3,711,169 | 1/1973 | Gardner | 384/309 |
| 3,807,814 | 4/1974 | Stopp | 384/312 |
| 3,980,352 | 9/1976 | Carlson | 384/302 |
| 4,097,094 | 6/1978 | Gardner | 384/215 |

FOREIGN PATENT DOCUMENTS 155339 12/1979 Japan .................................. 384/398

Primary Examiner—Stuart S. Levy
Assistant Examiner—Thomas R. Hannon
Attorney, Agent, or Firm—Hedman, Gibson, Costigan & Hoare

[57] ABSTRACT

A pivoted segmental bearing in which leaf springs are disposed angularly equidistant between the outer surface of the annular shoe support member and the overlying inner surface of the outer support casing, and wherein the springs are immersed in the lubricating oil for the bearing. The annular shoe support member is also resiliently pressed axially against a wall of the outer support casing by helical springs.

3 Claims, 2 Drawing Figures

PIVOTED SEGMENTAL BEARING

This invention relates to improvements in a segmental bearing for supporting and damping the vibration of a rotating shaft, in particular a gas turbine drive shaft. More specifically, the invention relates to an effective and simple vibration damping system for a pivoted segmental bearing which drastically dampens the oscillation amplitude, however high, of the vibration which arises due to unbalance in the rotating assembly, particularly when passing through critical speeds at low rates of working, and which enables the resilience of the shaft support bearing and consequently the critical speeds to be varied at will, without substantially changing the overall size of the bearing.

A pivoted segmental bearing is generally used when large shafts, which are easily subject to vibration, have to be supported. The pivoted segmental bearing is able to support high loads and to damp the vibration.

The pivoted segmental bearing known in the art includes a set of shoes of rigid antifriction material pivotally mounted and angularly equidistant on the inner surface of an annular shoe support member which is disposed about the shaft to be supported and contained in an outer casing. The chamber in which the shoes are disposed is filled with lubricating oil under pressure.

In this type of bearing, the damping action for the oscillations generated by the shaft vibration is due to the fact that the vibration causes the pivoted shoes to oscillate so that the gaps between said shoes and, respectively, the shaft to be supported and the annular shoe support member vary continuously. This gives rise to rapid oil movement in the cavities which are formed, with resultant pumping and sucking action therein leading to obvious damping effects. However, the known bearings have a series of drawbacks, the most important of which is that they are unable to completely absorb a certain level of unbalance because the extent of variation of the gaps, on which the damping effect depends, is minimal. Again, the rigidity of the structure, i.e. the impossibility of varying the resilience of the pivoted segmental bearing leads to the further drawback of not being able to appropriately vary the critical speed limit in order to move it outside the normal range of operation of the shafts to be supported.

Finally, it must be noted that known bearings and the structures which support them are generally not of uniform rigidity in the horizontal and vertical planes, so that the theoretical critical speeds become divided.

The object of the present invention is to obviate the aforesaid drawbacks and provide a new pivoted segmental bearing which is highly effective in vibration damping, which enables its resilience to be easily varied in order to modify the critical speed limit at will, and which has a uniform radial rigidity, while not substantially changing the overall size in comparison to known bearings.

This is substantially attained by disposing leaf springs angularly equidistant between the outer surface of the annular shoe support member and the overlying inner surface of the outer support casing, wherein the springs are immersed in lubricating oil.

More specifically, a pivoted segmental bearing, having a series of shoes of rigid antifriction material pivotally mounted angularly equidistant on the inner surface of an annular shoe support member disposed about the shaft to be supported and contained in an outer support casing, and opposing walls which are provided with seal gaskets for the lubricating oil which fills the chamber in which the shoes are disposed, is characterised according to the present invention by disposing a series of leaf springs between the outer surface of the shoe support member and the overlying inner surface of said outer support casing there is which are held angularly equidistant in position by lateral positioning pins supported by said outer support casing, filling the annular chamber in which said leaf springs are disposed by the lubricating oil, and providing means for resiliently pressing the annular shoe support member axially against one of the opposing walls of the outer support casing.

The advantages of such a construction are immediately apparent.

First, the entire support member with its shoes now follows the displacement of the shaft being supported, and is opposed by the rigidity of the leaf springs. In other words, the system is no longer rigid but resilient, and its resilience can be easily varied at will by replacing the leaf springs with others of different rigidity. Moreover, if an unbalance shaft causes the shoe support ring to move, the leaf springs are compressed and bend, thereby changing the gaps between them and the annular shoe support member and outer support casing. These will now be of a greater extent and involve relatively large areas, thus causing substantial oil movement and consequentially a considerable damping effect. Again, the damping effect of the bearing is further increased by the friction between the annular shoe support member and the front wall of the outer support casing which are kept resiliently pressed together by the described means.

A further advantage is therefore the considerable compactness of the structure, the overall size of which is increased only slightly in the radial direction but not in the axial direction relative to the overall size of known bearings. According to a preferred embodiment of the present invention, the leaf springs have a width equal to the length of the annular shoe support member, and are formed from a single cut ring having a radius greater than that of the shoe support ring.

In this manner, it is possible to obtain spring radii and thicknesses with very strict tolerances and in an economical and simple manner, thus providing uniformity in the gaps created by said springs and consequently a uniform load distribution, and thus giving a structure having uniform rigidity in all directions.

A further characteristic of the present invention is that the means for resiliently pressing the annular shoe support member axially against one of the opposing walls of the outer support casing includes a series of helical springs which are inserted into a corresponding series of axial cavities provided angularly equidistant on the circumference of said annular shoe support member, and which cooperate with the other of the opposing walls of the outer support casing.

Finally, according to a further preferred embodiment of the invention the annular shoe support member comprises a circumferential groove in its outer surface and radial bores therethrough to facilitate passage of the lubricating oil. The invention is described in detail hereinafter with reference to the accompanying drawings which illustrate a preferred embodiment thereof, it being understood that modifications can be made thereto without departing from the scope of the present invention.

Figure 2:
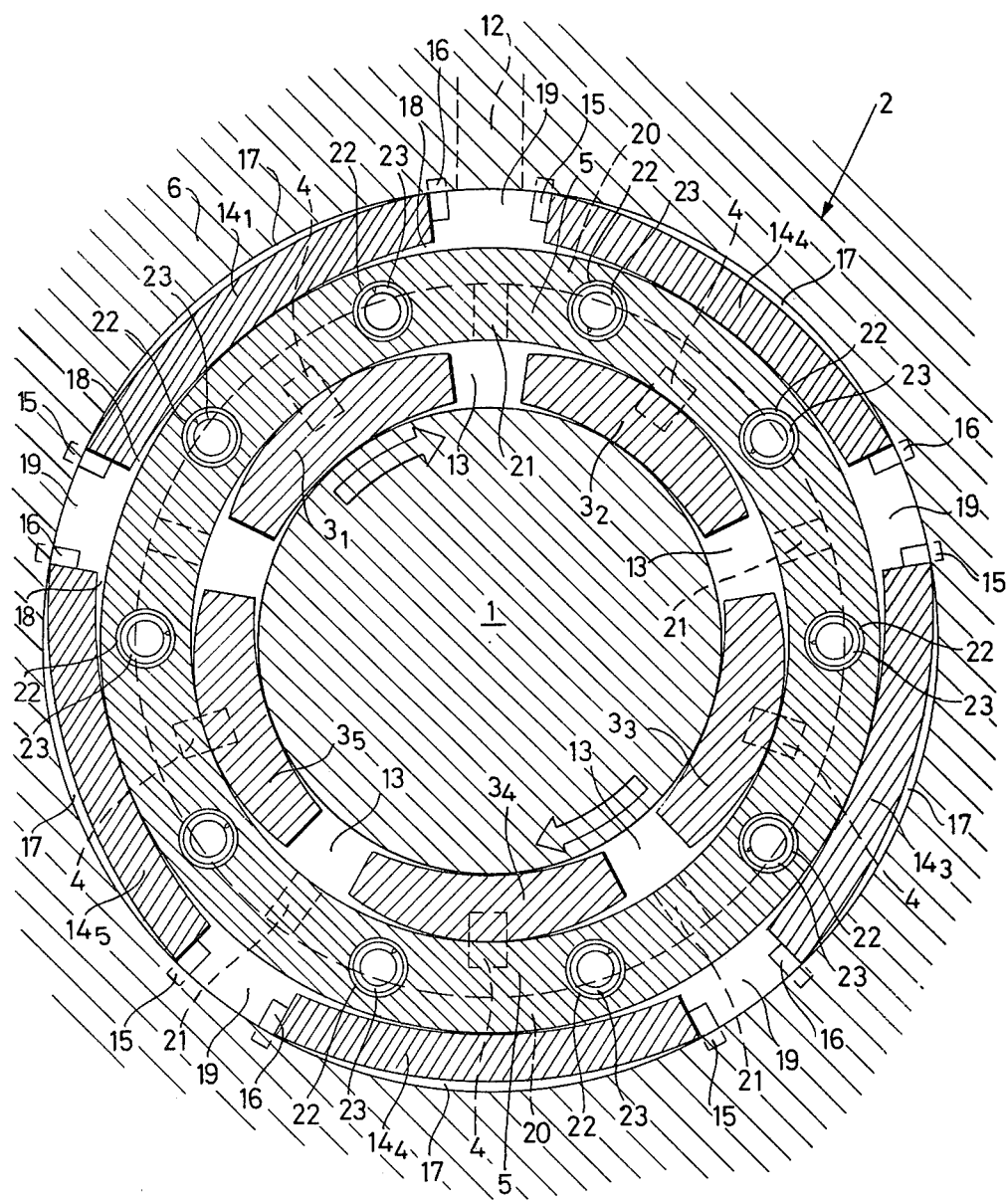
FIG. 2 is a front section of the pivoted segmental bearing, taken on the line II—II of FIG. 1.

With reference to the figures, a gas turbine shaft 1 is supported by the pivoted segmental bearing 2. The bearing 2 consists of a series of shoes of rigid antifriction material $3_i$ (FIG. 2 shows five shoes $3_1$, $3_2$, $3_3$, $3_4$ and $3_5$) which are disposed angularly about the shaft 1 and which are pivotally supported by pivots 4 at the inner surface of the annular shoe support member 5 contained in an outer support. The casing 6 is closed frontally by the paid of opposing walls 7 and 8 which are fixed to the casing 6 by the screws 9. The walls 7 and 8 are also provided with seal gaskets, 10 and 11 respectively, for the lubricating oil which is fed under pressure through the feed duct 12 present in the casing 6 and completely fills the annular chamber 13 in which the shoes $3_i$ are disposed. Between the outer surface of the annular shoe support member 5 and the overlying inner annular surface of said outer support casing 6 there is also disposed a series of leaf springs $14_i$ (FIG. 2 shows five leaf springs $14_1$, $14_2$, $14_3$, $14_4$ and $14_5$) held angularly equidistant in position by pairs of lateral positioning pins, 15 and 16 respectively, supported by the casing 6.

Figure 1:
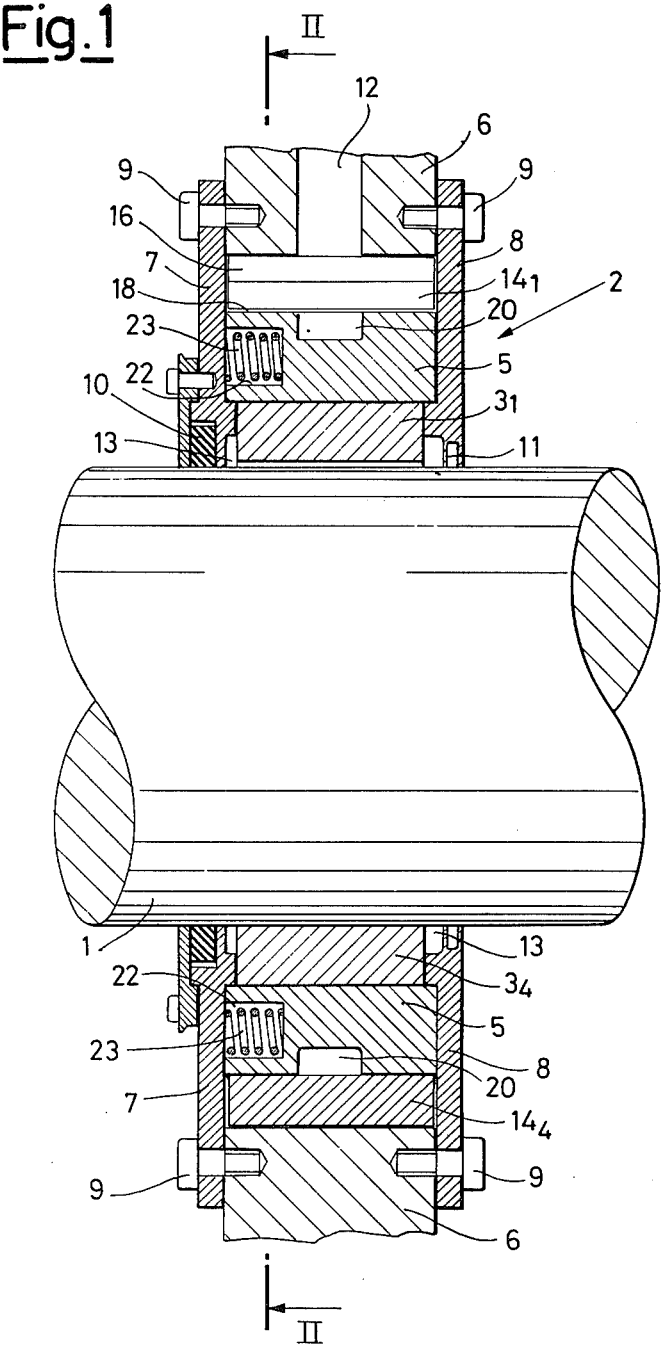
FIG. 1 is a partial lateral sectional view taken through a pivoted segmental bearing incorporating the vibration damping system of the invention.

The leaf springs $14_i$ have a width equal to the length of the annular shoe support member (see FIG. 1) and are formed by cutting a single ring of radius greater than the radius of said shoe support member 5, so as to ensure uniformity of the gaps 17 and 18 created thereby.

In order to facilitate the passage of lubricating oil from the duct 12 to the chamber 13 and to totally fill the annular chamber 19 in which the leaf springs $14_i$ are located, the annular shoe support member 5 is provided with a circumferential groove 20 in its outer surface, and with radial bores 21 therethrough.

Finally, the annular shoe support member 5 also comprises a series of circumferential axial cavities 22 housing a corresponding series of helical springs 23 which cooperate with said front wall 7 of the outer support casing 6 in order to resiliently press the annular shoe support member 5 against the other wall 8.

I claim:

1. A pivoted segmental bearing, having a series of shoes of rigid antifriction material in a chamber wherein the shoes are pivotally mounted angularly equidistant on the inner surface of a shoe support member disposed about the shaft to be supported and contained in an outer support casing, and opposing walls which are provided with seal gaskets for lubricating oil which fills and places the chamber in which said shoes are disposed under pressure, characterised in that between the outer surface of said annular shoe support member and the overlying inner surface of said outer support casing there is disposed a series of leaf springs held angularly equidistant in position by lateral positioning pins supported by said outer support casing, the annular chamber in which said leaf springs are disposed also being filled by the lubricating oil, and means provided for resiliently pressing said annular shoe support member axially against one of said walls of the outer support casing, including a series of helical springs which are inserted into a corresponding series of axial cavities provided angularly equidistant on the circumference of said annular shoe support member, and which cooperate with the other of said walls of the outer support casing.

2. A pivoted segmental bearing as claimed in claim 1, characterised in that said leaf springs have a width equal to the length of the annular shoe support member, and are formed from a single cut ring having a radius greater than that of the shoe support ring.

3. A pivoted segmental bearing as claimed in claim 1, characterised in that said annular shoe support member comprises a circumferential groove in its outer surface and has radial bores therethrough.

* * * * *